United States Patent
Kim

(10) Patent No.: US 9,377,870 B2
(45) Date of Patent: Jun. 28, 2016

(54) DEVICE AND METHOD FOR INPUTTING INFORMATION

(71) Applicant: LG INNOTEK CO., LTD., Seoul (KR)

(72) Inventor: Jong Bok Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/396,972

(22) PCT Filed: Jan. 30, 2013

(86) PCT No.: PCT/KR2013/000760
§ 371 (c)(1),
(2) Date: Oct. 24, 2014

(87) PCT Pub. No.: WO2013/162159
PCT Pub. Date: Oct. 31, 2013

(65) Prior Publication Data
US 2015/0138095 A1    May 21, 2015

(30) Foreign Application Priority Data

Apr. 26, 2012  (KR) .......................... 10-2012-0044109

(51) Int. Cl.
| | |
|---|---|
| *G06F 3/023* | (2006.01) |
| *G08C 17/02* | (2006.01) |
| *H04N 21/422* | (2011.01) |
| *G06F 3/0346* | (2013.01) |
| *G06F 3/0484* | (2013.01) |
| *G06F 3/0482* | (2013.01) |
| *G06F 3/0489* | (2013.01) |

(52) U.S. Cl.
CPC ............. *G06F 3/0236* (2013.01); *G06F 3/0346* (2013.01); *G06F 3/0482* (2013.01); *G06F 3/0489* (2013.01); *G06F 3/04842* (2013.01); *G08C 17/02* (2013.01); *H04N 21/42204* (2013.01); *G08C 2201/32* (2013.01)

(58) Field of Classification Search
CPC ..... G06F 3/0236; G06F 3/0346; G06F 3/0482; G06F 3/04842; G06F 3/0489; G08C 2201/32; H04N 21/42204
USPC .................................................. 345/156, 169
See application file for complete search history.

(56) References Cited

U.S. PATENT DOCUMENTS

| | | | |
|---|---|---|---|
| 2005/0210402 A1* | 9/2005 | Gunn ..................... | G06F 3/0236 715/773 |
| 2009/0153475 A1 | 6/2009 | Kerr et al. ...................... | 345/157 |
| 2011/0055873 A1 | 3/2011 | Heo et al. ......................... | 725/52 |
| 2011/0071818 A1* | 3/2011 | Jiang ..................... | G06F 3/0236 704/8 |
| 2011/0119621 A1 | 5/2011 | Cho et al. ....................... | 715/788 |

FOREIGN PATENT DOCUMENTS

| | | |
|---|---|---|
| KR | 10-2010-0004243 A | 1/2010 |
| KR | 10-2011-0054418 A | 5/2011 |
| KR | 10-2011-0068421 A | 6/2011 |

OTHER PUBLICATIONS

International Search Report dated Jun. 27, 2013 issued in Application No. PCT/KR2013/000760.

* cited by examiner

*Primary Examiner* — Viet Pham
(74) *Attorney, Agent, or Firm* — KED & Associates LLP

(57) ABSTRACT

Embodiments relate to classifying character information to be input by category and inputting the information classified by category by using the motion information of a motion remote control working as an input unit. Character information input according to embodiments is as follows. At least one of a mode and a key to input information is selected, a category including information to be input is selected, and by moving an in input unit to be corresponded to the information direction in the category activated on a display device on the basis of the selection, character information is input/output on the display device on the basis of the motion direction information.

10 Claims, 5 Drawing Sheets

DEVICE AND METHOD FOR INPUTTING INFORMATION

CROSS-REFERENCE TO RELATED PATENT APPLICATIONS

This application is a U.S National Stage Application under 35 U.S.C. §371 of PCT Application No. PCT/KR2013/000760, filed Jan. 30, 2013, which claims priority to Korean Patent Application No. 10-2012-0044109, filed Apr. 26, 2012, whose entire disclosures are hereby incorporated by reference.

TECHNICAL FIELD

The present disclosure relates to classifying information to be input by category and inputting/outputting/correcting the information that has been classified by category by using the motion information from an input unit.

BACKGROUND ART

In the inputting of information by using a motion remote control device that is a type of input unit, an on-screen keyboard is used for keyboard inputs. In the case of the on-screen keyboard, a keyboard is displayed on a TV screen that is a display device, and a remote control is used to move a cursor onto character buttons to be input, and a select button is pressed so that a desired button is selected and a character is input.

DISCLOSURE OF INVENTION

Technical Problem

Embodiments provide an input device and method that enable easy information input.

In embodiments, at least one of pieces of information is stored in a memory unit, which are information classified by category (for example, in case that characters to be input are English, a to h, i to p, q to x, and the others are classified into category 1, category 2, category 3, and category 4, respectively) based on a predetermined criterion for pieces of character information to be input and information involved with the classified information (for example, category information on character information a to h is stored in key 1 on a remote control that is an input unit).

In embodiments, a mapping table between motion information of a motion remote control as an input unit and character information corresponding to the motion information is store in a memory unit.

In embodiments, if commands to input character information received from an input unit, then the information classified by category is output to a display device.

In embodiments, if a key command corresponding to a category with character information to be input among the categories displayed on the display device is input, then the selected corresponding category is activated.

In embodiments, character information in an activated one of the classified categories and the motion information of a remote control on the character information are matched by using a mapping table to input corresponding character information.

Embodiments suggest performing correction and input by using a predetermined key, if the input information is not a character to be input by a user.

Solution to Problem

In one embodiment, a device for inputting information includes a memory unit storing at least one of information in which pieces of character information to be input on the basis of a predetermined criterion are classified by category and information in which the classified category information is set to correspond to a predetermined key of a remote control; a button input unit generating at least one of a command to switch to a mode in which character information is input and a command to select a category including character information to be input; a motion sensing unit sensing the motion of the remote control by using a sensing unit to allow character information in the selected category to be output on the basis of the operation of the button input unit; a transmitting unit transmitting at least one of a signal involved with the mode switch, a signal for the selected category, and information according to the motion of the remote control; and a control unit controlling each of said units.

In another embodiment, a method of inputting information includes receiving a command to input information; selecting a category including information to be input; moving an input unit to correspond to the information direction in a category activated on a display device on the basis of the selection; outputting the motion direction information of the input unit; and transmitting the motion direction information of the input unit to the display device.

In further another embodiment, a device for inputting information associated with a display device receiving motion-related information from an input unit includes a memory unit storing information in which pieces of character information to be input are classified by category; a receiving unit receiving a signal for inputting character information received from the input unit and the motion information of the input unit; an output unit outputting a category activated on the basis of at least one of a signal for inputting character information received from the input unit and a category selection signal; and a control unit controlling the input of a character in the category on the basis of the received motion information.

In still further another embodiment, a method of inputting information includes storing pieces of information classified by category on the basis of a predetermined criterion in the memory unit of a display device; receiving a command to input information; outputting the classified categories; selecting a category with information to be input from among the output categories; and selecting information to be input on the basis of the motion information of an input unit from among pieces of information in the selected category.

The details of one or more embodiments are set forth in the accompanying drawings and the description below. Other features will be apparent from the description and drawings, and from the claims.

Advantageous Effects of Invention

The embodiments may input character information more easily and faster by moving a motion remote control working as an input unit to character information direction to be input among character information in the category selected and inputting the character information by using the motion information.

BEST MODE FOR CARRYING OUT THE INVENTION

An input device and method according to embodiments will be described below with reference to the accompanying drawings.

First, while the terms used in embodiments has been selected as general ones being currently widely used if possible, it should be made public that specific cases use the terms selected arbitrarily by the applicant and embodiments should be appreciated by the operation and meaning of the terms, not the name of the terms simply, since the operation and meaning of the terms have been described in detail in corresponding embodiments.

In describing embodiments, alphabets, a question mark (?), and a space are described as examples of character information to be input and classification by category but embodiments are not limited thereto.

Thus, character information to be input and classified includes all characters, such as figures, Korean character, other languages, symbols, etc.

Also, as a predetermined criterion for classifying character information, a to h, i to p, q to x, and the others that are alphabets are respectively classified into categories 1 to 4 but embodiments may variously classify character information without limiting thereto, on the basis of user s convenience or a system environment.

Also, although a motion remote control is described as an example of an input unit in describing embodiments, embodiments are not limited thereto. Thus, other input units are included, such as direct input, input through a mouse, voice input, etc.

Also, although a TV is descried as an example of a display device in describing embodiments, embodiments are not limited thereto. Thus, embodiments may be applied to all devices with a display unit that may output information, such as PMPs, mobile phones, etc.

Also, although description is made that an input unit is separated from a display device in describing embodiments, embodiments are not limited thereto. Thus, it is possible to implement the input unit and the display unit in an integrated form.

Also, in describing embodiments, what components are coupled or come into contact includes when they are directly coupled and are mechanically or electrically coupled through other components or elements.

Figure 1:
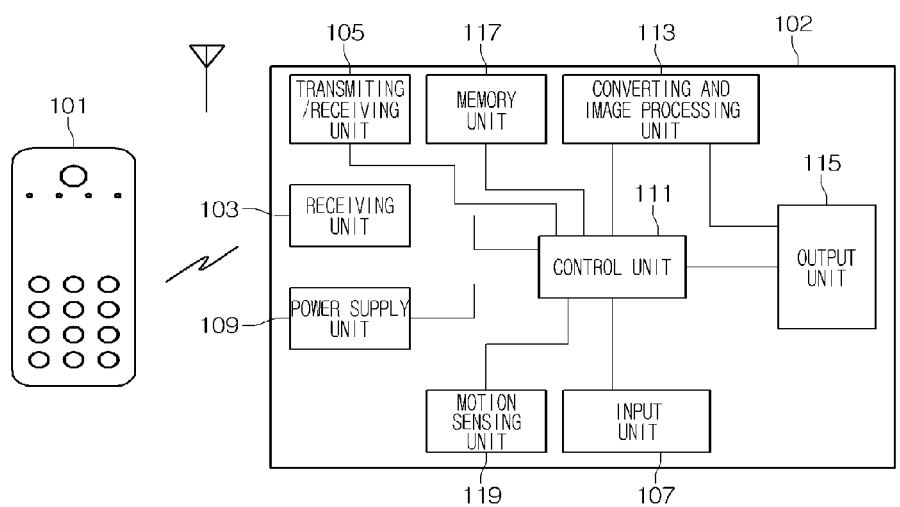
FIG. 1 is a block diagram representing an input device and a display device according to an embodiment.

FIG. 1 is a block diagram representing an input device and a display device according to an embodiment.

Figure 2:
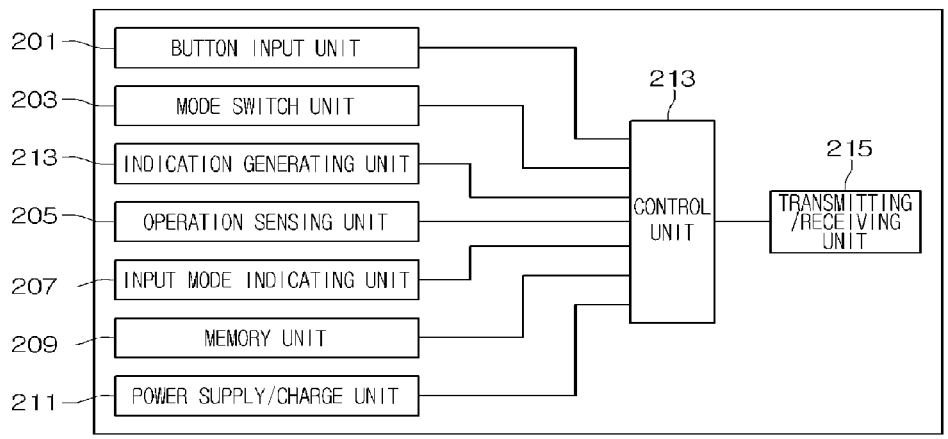
FIG. 2 is a block diagram of a motion remote control that is an input device according to an embodiment.

FIG. 2 is a block diagram of a motion remote control that is an input device according to an embodiment.

First, referring to FIG. 1, this figure includes a remote control 101 and a display device 102. The remote control is an input device to input user commands. The display device receives commands or signals to which at least one of pieces of information is input, including an operation mode switch command for inputting character information from the remote control, a category selection command, motion direction information, corresponding character information according to the motion direction information, and information for correcting input information.

A sensor for sensing motion direction, namely a gyro sensor is built in the motion remote control 101. A corresponding character is input though a mapping table storing mapping of the motion direction/angle information of the sensor to the direction/angle/position information of each input character in an activated category. Also, since a pointing function may be given to the motion remote control, it is possible to easily move in the direction of a character to be input in the activated category.

The display device 102 of FIG. 1 relates to a display device that receives motion information from the motion remote control working as an input unit to allow character information to be input/output.

The display device includes a memory unit 117, a receiving unit 103, an on output unit 115, and a control unit 111. The memory unit stores at least one of pieces of information in which pieces of character information to be input are classified by category (for example, in case that characters to be input are English, a to h, i to p, q to x, and the others are classified into categories 1 to 4, respectively) and information in which the classified category information corresponds to each key of the remote control (for example, category information on the character information a to h, category information on the character information i to p, category information on the character information q to x, and the other character information are respectively stored in keys 1 to 4 of the remote control working as an input unit). The receiving unit receives commands to input character information received from the input unit 101 (for example, a mode switch command for inputting characters, and/or a category selection command) and the motion information of the input unit. The output unit outputs categories activated by at least one signal of commands for inputting character information received from the input unit (for example, a mode switch signal, a category selection command (for example, a signal for selecting a category in which there is character information to be input)). The control unit controls so that characters in the category are input on the basis of the received motion information of the input unit.

The display device 102 according to the embodiment is configured to include an operation sensing unit that may sense the operation of the remote control 1010, a power supply unit 109, a converting and image-processing unit 113 that processes information, voices, and images received, an input unit 107 that may input user commands, and/or a transmitting/receiving unit 105 for transmitting/receiving from the outside.

A mapping table of the motion direction information of a remote control working as an input unit and character information corresponding to the direction information is stored in the memory unit 117 of the display device configured as described above, and the control unit matches character information according to the motion information of the remote control by using the information stored and controls it to output through the output unit 115.

The configuration of the remote control 101 of FIG. 1 is additionally described with reference to FIG. 2.

As represented in FIG. 2, the motion-sensing remote control 101 capable of switching operation modes (switching from the general functions of a remote control to a character information input function) provides an information input device. The information input device is characterized by including a memory unit 209, a mode switch unit 203, a button input unit 201, an operation sensing unit 205, a transmitting/receiving unit 215, and a control unit 213. The memory unit stores at least one of pieces of information in which pieces of character information to be input are classified by category (for example, in case that characters to be input are English, a to h, i to p, q to x, and the others are classified into categories 1 to 4, respectively) and information in which the classified category information corresponds to each key of the remote control (for example, category information on the character information a to h, category information on the character information i to p, category information on the character information q to x, and the other character information are respectively stored in keys 1 to 4 of the remote control working as an input unit). The mode switch unit switches to a mode in which character information is input. The button input unit generates signals for enabling the selection of a corresponding category including character information to be input, according to the mode switch. The operation sensing unit senses the motion of the remote control by using a sensor so that the character information selected on the basis of the motion of the button input unit is input. The transmitting/receiving unit 215 transmits at least one of a signal involved with the mode switch, a signal for the selected category, a signal for the error correction of an input signal, information according to motion, to a display device. The control unit controls each of the components.

The mode switch unit 203 for switching to a mode in which character information is input and the button input unit 201 for generating signals for enabling the selection of a corresponding category including character information to be input according to the mode switch has been described as separate components, but it is to clearly describe this embodiment and as an alternative, a key predetermined to switch to a mode for inputting character information may be configured on the button input unit.

In addition, according to the operation of the mode switch unit, an indicator (for example, a cursor, a pointer, etc.) will be generated by an indication generating unit 213 for inputting information and will be displayed on the output unit of the display device of FIG. 1, and a user will correspondingly carry out category selection and/or the movement of the input unit.

In addition, the remote control generally includes a power supply/charge unit 211 for operating the remote control.

In addition, the memory unit of the remote control may store at least one of the motion direction information of the remote control and character information corresponding to the direction information and the operation sensing unit 205 outputs information according to motion by using the information stored.

For example, when recognizing the motion direction information of the remote control, characters to be input may be matched and input on the basis of a mapping table of information divided into each angle region obtained by dividing 360 by the number of characters in each category and/or a character corresponding to each angle divided.

Meanwhile, the match of the motion direction information of the remote control to a character corresponding to it is generally is done as follows. The remote control transmits only each of motion direction information to the display device, and characters to be input are matched and input/output on the basis of a mapping table of the motion direction information received from the display device and each of information that has been previously stored and corresponds to the motion direction information, for example a character corresponding to the motion direction/angle of the remote control, but the present invention is not limited thereto. Thus, as another example, the remote control may transmit the character information matched to the display device.

Also, the operation sensing unit 119 configured in the display device may sense the motion direction and corresponding character information may be input by using a mapping table correspondingly.

An example of a mapping table of the motion direction of the remote control mentioned above to character information on the basis of the motion direction is as follows.

TABLE 1

| Motion Direction Angle of Remote Control | Corresponding Character Information in Category 1 |
| --- | --- |
| −22.5~+22.5 | E |
| +22.6~+67.5 | D |
| +67.6~−112.5 | C |
| −112.6~−157.5 | B |
| −157.6~−202.5 | A |
| −202.6~−247.5 | H |
| −247.6~−292.5 | G |
| −292.6~−337.5 | F |

Although it is described that the mapping table and each of information below are store in both a remote control device and a display device when describing the embodiment, this is just an example and information may be stored only in the display device or the remote control, or only necessary information may be stored in each device so that a realization may be made according to each embodiment.

That is, the following information may be stored in each device in various ways on the basis of each embodiment to be able to be used for operations.

Information that pieces of character information to be input are classified by category (for example, in case that characters to be input are English, a to h, i to p, q to x, and the others are classified into categories 1 to 4, respectively) and pieces of information in which the classified category information corresponds to each key of the remote control (for example, category information on the character information a to h, category information on the character information i to p, category information on the character information q to x, and the other character information are respectively stored in keys 1 to 4 of the remote control working as an input unit are stored.

Meanwhile, although in the embodiments as described above, it is described that the motion remote control transmits motion direction information to the display device and the display device matches the characters to be input through mapping to character information in each category on the basis of the motion direction information transmitted, the present invention is not limited thereto.

Thus, the motion remote control may transmit the characters to be input to the display device through the mapping of motion direction information to characters corresponding to it.

Also, in order to sense the motion direction of the motion remote control, the display device may include the operation sensing unit 119 for sensing the operation of the remote control to determine and input a corresponding character on the basis of the unit.

Figure 3:
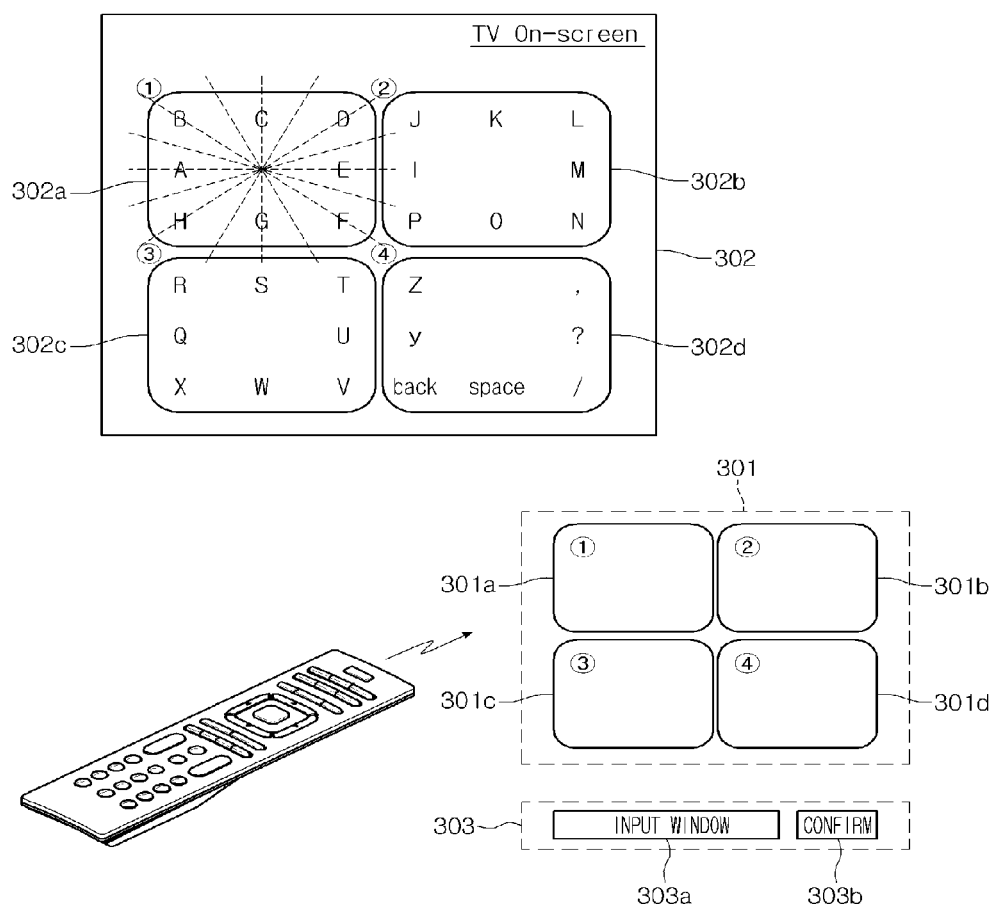
FIG. 3 is a view representing character information classified by category.

FIG. 3 is a view representing character information classified by category.

As illustrated in this figure, character information to be input as an example is divided into four categories 301, each of which matches the keys of the remote control, for example 1 (301a), 2 (301b), 3 (301c), and 4 (301d). Then, corresponding categories are stored.

Also, when classifying each of character information, in the case of information on alphabets, a to h, i to p, q to x, and the others are classified and stored into categories 1 (302*a*), 2 (302*b*), 3 (302*c*), and 4 (302*d*).

Thus, the category information classified is stored to be matched to each key of the remote control. For example, the key 1 of the remote control working as an input unit stores category information on character information a to h, the key 2 of the remote control stores category information on character information i to p, the key 3 of the remote control stores category information on character information q to x, and the key 4 of the remote control stores the other character information.

The embodiments are described with reference to FIGS. 1 to 3.

If a user wants to input character information, then he/she changes the remote control to a character information operation mode through the mode switch unit 203 of the remote control 101 to input character information, and a screen 300 classified by category as in FIG. 3 is thus output to the output unit 115 of the display device 102.

If pressing a category number with character information to be input by a user among the categories output through the button input unit 201 of FIG. 2, then a category with corresponding character information is activated.

If a motion remote control moves to a corresponding character direction in the category activated with reference to the motion of a cursor in the direction of a character to be input by a user, then the sensor (for example, a gyro sensor, etc.) of the operation sensing unit 205 built in the remote control transmits the motion direction information of the remote control to the display device 102, the receiving unit 103 of the display device receives it, and the control unit 111 coming into contact with the receiving unit controls so that the corresponding character information matched by using a mapping table stored in the memory unit 117 is output on the output unit 115.

If a command according to a mode switch is received from the remote control, then pieces of character information classified on the basis of a predetermined criterion are output on the output unit 115 of the display device 102 in a state of being classified by category (See 300 in FIG. 3).

For example, in case of English, character information a to h, character information i to p, character information q to x, and the others are respectively classified into categories 1 to 4 and represented on a screen.

The key button of a motion remote control corresponding to a category with a character to be input is pressed to select the category. The motion remote control moves to a character direction to be input in the category selected to input a desired character. It is possible to input characters more easily and faster in this way.

Adding some matters, the character information input by the operation of the motion remote control will be displayed on an output unit to enable a user to confirm (See 303 in FIG. 3) and the user will be able to confirm and modify the information displayed.

If information to be input on the basis of the motion information of the input unit is selected among pieces of information in the category selected, then the information selected is displayed on the output unit. As a result of confirming whether the information displayed corresponds to information to be input, if not, then correction may be carried out by using a predetermined input unit (for example, delete, etc.).

Meanwhile, before correcting by using the predetermined input unit (for example, delete, etc.), a switch to a correction mode may be made.

If there is a need to complete inputting information through the operations, a predetermined input unit (for example, a confirm key) may be input.

Pieces of information to be input are classified into at least two categories in this embodiment, and each category includes at least two pieces of information to be input.

Figure 4:
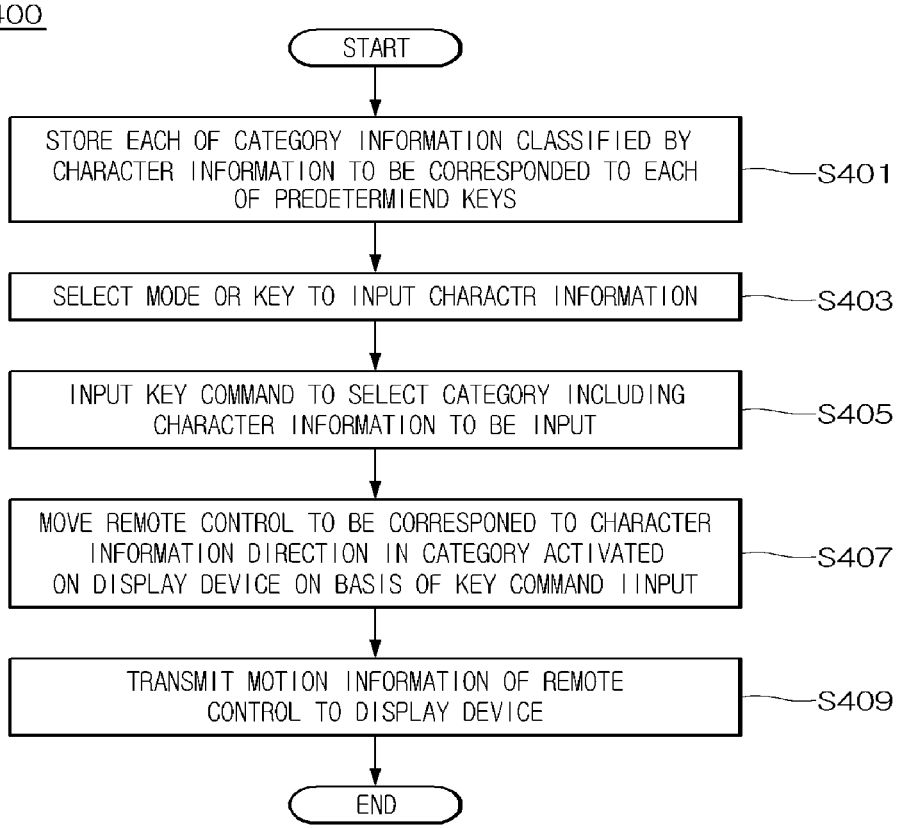
FIG. 4 is a flow chart representing the operations of a motion remote control that is an input device.

FIG. 4 is a flow chart representing the operation of a motion remote control that is an input device.

As described above, while each of category information classifying character information is stored in the memory unit of the input device and/or the display device, if a user wants to input character information and selects predetermined key for a mode switch that has been configured in the input device, then a corresponding command is input and a corresponding function is performed. The predetermined key for the mode switch may be pressed above, but a command for a mode switch will be able to be input through another way, for example voices, in steps S401 and S403.

Pieces of the category information classified will be output on the output unit 115 of the display device on the basis of a command for inputting character information as described above, and a user selects a corresponding category with character information to be input in step S405.

The category activated on the basis of the category selection command is output on the display device, and a user moves a motion remote control working as an input device to character information direction to be input among a plurality of characters in the category activated, in step S407.

On the basis of the motion of the motion remote control, the motion information of the remote control and/or character information to be input according to the motion information are transmitted to the display device as represented in Table 1 above, in step S409.

Although each of category character information classified is generally stored in the memory unit 209 of the remote control to be corresponded to each key of the remote control in the embodiments as 302 in FIG. 3, only a predetermined key corresponding to each category may simply set without storing character information of each category and if a corresponding key is pressed, the character information of the category in the memory unit 117 of a display device in a classified way may be output on the basis of the key command.

In this embodiment, category selection to input character information is performed by the pressing of a corresponding key of a predetermined input unit. Character information that is obtained for the first time by the moving of a remote control working as an input device in a state of pressing the key is input and character information obtained from the second time in a state of pressing the key is not input but ignored.

However, as another embodiment, it is possible for the character information input for the second time and since then to be successively input.

The method of inputting character information in an input device as described above will be additionally described.

If a category button corresponding to character information to be input is pressed, the input device becomes a standby state, and if the motion of the remote control is recognized, it is recognized as a character input command and an operation is carried out. Once the character input command is recognized, no operations are carried out until a corresponding category button becomes OFF. Thus, an operation to make a category button become OFF becomes a reset operation for inputting a following character.

Thus, in order to input character information again, the category button should become OFF and then ON.

Figure 5:
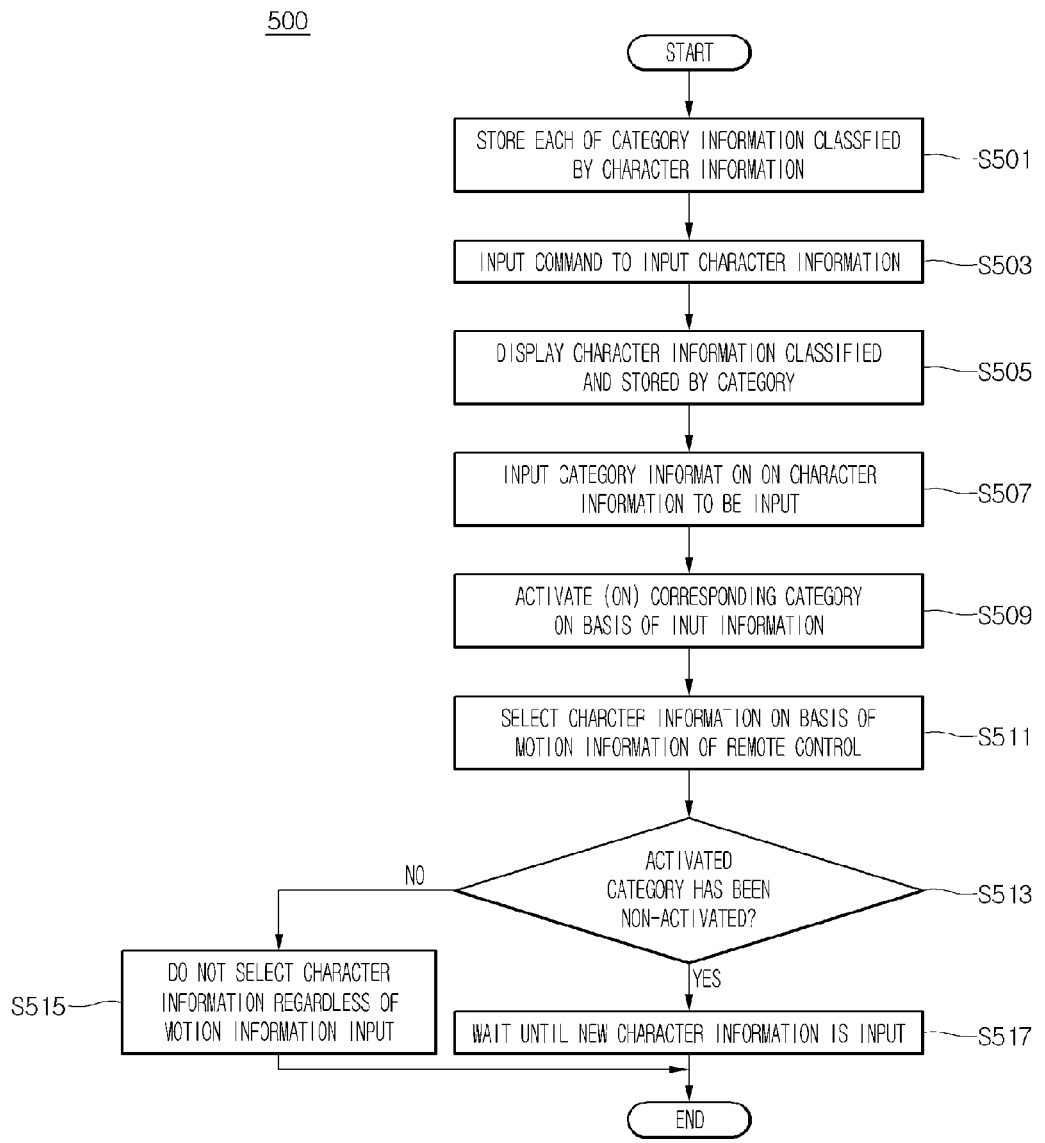
FIG. 5 is a flow chart representing the operations of a TV that is a display device.

FIG. 5 is a flow chart 500 representing the operations of a TV that is a display device.

First, the operations of the display device 102 receiving information involved with the motion of the input device 101 are generally described.

When inputting character information, character arrangement will be displayed on the output unit of the display device in a state of being classified by category as 302 in FIG. 3, and if category 1 is pressed, the category is activated to be able to easily perceive which category a user has selected.

If in this state, a remote control moves to a direction where there is a character which a user wants to input, the moving direction of the remote control is recognized and a character corresponding to the direction moved is input.

Thus, according to this method, character information is input on the basis of the motion information of the remote control itself. When a user uses a motion remote control, a cursor is displayed, and if inputting character information, the user may determine through the motion of the cursor whether the direction input by him/her is correct.

The memory unit 117 of the display device 102 of FIG. 1 stores at leas one of information of each key, information in which character information has been classified by category, the classified character information, and a mapping table of the motion direction information of the remote control of Table 1 above to corresponding character information, in step S501.

The receiving unit 103 of the display device receives a command to input character information, a predetermined command for the remote control working as an input device, or a predetermined command configured for the display device, in step S503.

Although a command output from the remote control (for example, a mode switch command for inputting characters and/or a command carried out by pressing a predetermined key) is described as a command to input character information in this embodiment, the present invention is not limited thereto but will be carried out by voices or in other methods.

If the command to input character information as described above is received, the character information classified by category is output on the output unit 115 of a display device as in FIG. 3, in step 505.

A user selects a category with character information to be input with reference to the category information output and character information in each category by using a corresponding key predetermined, in step S507.

If a command for a corresponding key as described above is received, a corresponding category is activated to enable a user to easily recognize the corresponding category, in step S509.

If a user moves an input device to character information direction to be input with reference to the activated category and the character information direction in the activated category, then information involved with the motion of a remote control is transmitted to the display device on the basis of Table 1 above serving as one embodiment and a corresponding character is input/output on the basis of the information transmitted, in step S511.

The information transmitted from the remote control to the display device is at least one of the motion information of the remote control and character information corresponding to the motion.

Meanwhile, as another embodiment, the operation sensing unit 119 may be configured in the display device so that the motion of the remote control is sensed by itself and a corresponding character is input.

If character information to be input is input on the basis of the operations, then the state of a corresponding category activated in the display device is confirmed. If it still has in an activated state, then character information recognized since the first time on the basis of the motion information of the remote control is not input but ignored, in steps S513 and S515.

Meanwhile, since the activated category becomes a non-activated state, if any category is activated, then a stand-by state is maintained, and if character information on the basis of the motion information of the remote control is recognized, then an operation to input character information is performed, in step S517.

As described above, the selection of character information to be input is performed by using at least one of character information position (including angle) arranged in a category and the motion direction information of an input unit.

In particular, as represented in Table 1 above, the control unit 111 matches and selects information to be input by using mapping table information of the character information position arranged in each category to the motion direction of an input device. The selection is performed by using the motion direction information of the input device moving to at least up, down, left and right directions while the selected category is activated.

An example to input character information is as follows.

If a category button is pressed, the operation of the remote control is recognized and a character is input.

Meanwhile, once the category button is recognized and the character is input, motion input is not recognized and a stand-by state is maintained until the button is released. Then, when the button is released and again pressed, then a stand-by state for an input operation is maintained, the operation of the remote control is recognized, and a character is input.

As an example, if there is a need to sequentially input alphabets B, F, and H in FIG. 3, then button 1 is pressed to select category 1 from the remote control, the remote control moves to B direction, and the category button is released. The category button 1 is again pressed, the remote control moves to F direction, and the button is released. The category button 1 is again pressed, and the remote control moves to H direction. Thus, alphabets B, F, and H may be input.

Figure 6:
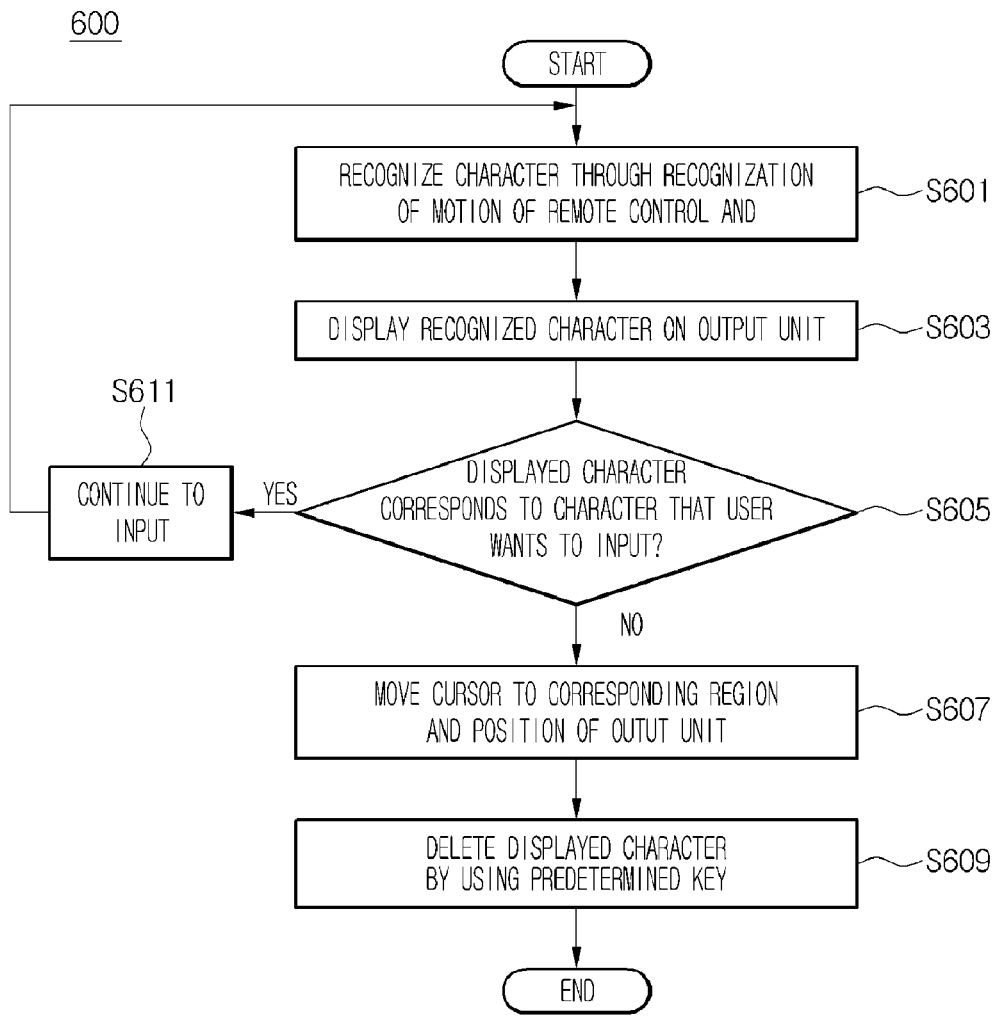
FIG. 6 is a flow chart representing operations for correcting input character information.

FIG. 6 is a flow chart in which input character information is displayed on an output unit (See 303 in FIG. 3 for 115 in FIG. 1) and is modified.

As represented in FIG. 6, while character information classified by category is output, information to be input is selected on the motion information of an input unit, in step S601.

The selected information is displayed on the output unit (See 303a in FIG. 3) in step S603.

It is confirmed whether the displayed information corresponds to information to be input in step S605.

As a result of the confirmation, if not, a cursor moves to a character region (See 303a in FIG. 3) and position to be modified and correction is carried out by using a predetermined input unit (for example, delete, back space, etc.) in steps S607 and S609.

Meanwhile, before correcting by using a predetermined input unit (a correction key) in the processes, a switch to a correction mode may be carried out.

In addition, if there is a need to complete inputting information or correction in the processes, a predetermined input unit (a confirmation key, etc.) may be input.

If the displayed information corresponds to a character to be input by a user in the process and there is a need to continue to input, then the input operation is continuously made in step S611.

The input device and method according to the embodiments may be applied to not only a motion remote control but also all devices (including portable terminals) with a display device that may display information (including characters, numerals, symbols) to be input by using the motion information of a device.

In addition, the technical spirit of the embodiments is not limited by the embodiments described above and the accompanying drawings but is construed by the following claims.

Thus, it will be obvious to those skilled in the art that various forms of replacements, variations, and changes are possible without departing from technical spirit of the present disclosure, and it will be said that they belong to the technical spirit described in the following claims.

INDUSTRIAL APPLICABILITY

The embodiments may be used for inputting information.

In particular, the embodiments may be used for classifying information to be input by category and inputting/outputting it accordingly.

The invention claimed is:

1. A method of an input unit for inputting information to a display device, comprising:
    detecting a predetermined key input;
    transmitting a category selection signal corresponding to a first category, displayed on the display device including a first character to the display device in response to the predetermined key input;
    acquiring motion direction information corresponding to a first direction in which the first character is positioned in the first category during a predetermined time span after detecting the predetermined key input; and
    transmitting the motion direction information to the display device,
    wherein the motion direction information is acquired by moving of the input unit while the predetermined key input is input.

2. The method according to claim 1, wherein the display device displays a plurality of categories including the first category.

3. The method according to claim 1, wherein the category selection signal is generated by the predetermined key input.

4. The method according to claim 3, wherein a second character is not obtained from an extra time by the moving of the input unit, and
    wherein the extra time is a time after the predetermined time span.

5. The method according to claim 1, further comprising:
    detecting a release of the predetermined key input; and
    transmitting a reset massage to release the first category to the display device in response to the release of the predetermined key input.

6. A device for receiving motion-related information from an input unit, the device comprising:
    a memory unit configured to store category information in which pieces of character information to be input are classified by category;
    a receiving unit configured to receive a category selection signal and motion direction information from the input unit; and
    a control configured to:
        determine a first category including a first character based on the category selection signal;
        activate the first category on an display unit based on the received category selection signal; and
        determine the first character based on the motion direction information,
        wherein the motion direction information corresponds to a first direction in which the first character is positioned in the first category displayed on the display unit, and
        wherein the motion direction information is acquired by the input unit during a predetermined time span after receiving the category selection signal.

7. The device according to claim 6, wherein the memory unit further stores a mapping table having the character information and moving information corresponding to the character information, and the control unit is further configured to match the moving information to the motion direction information for determining the first character.

8. The device according to claim 6, wherein the control unit is further configured to receive reset message to deactivate the first category from the input unit.

9. A method of a display device for inputting information, comprising:
    receiving a character input command from an input unit;
    displaying category information, in response to the character input command, in which pieces of character information are classified by category;
    receiving a category selection signal corresponding to a first category including a first character from among the displayed categories;
    activating the first category based on the category selection signal;
    receiving a motion direction information from the input unit; and
    determining the first character based on motion direction information,
    wherein the motion direction information corresponds to a first direction in which the first character is positioned in the first category displayed on the display device, and
    wherein the motion direction information is acquired by the input unit during a predetermined time span after receiving the category selection signal.

10. The method according to claim 9, wherein the determining of the first character includes matching the motion direction information with moving information corresponding to at least the pieces of character information,
    wherein the moving information is included in a mapping table, stored in a memory of the display device, and
    wherein the mapping table includes the character information and moving information corresponding to the character information.

* * * * *